(12) United States Patent
Mohr et al.

(10) Patent No.: US 7,644,286 B1
(45) Date of Patent: Jan. 5, 2010

(54) SYSTEM AND METHOD FOR RESTRICTING DATA ACCESS

(75) Inventors: Alexander Mohr, La Mirada, CA (US); Scott E. Petersen, Morgan Hill, CA (US); Edward R. Rowe, Sunnyvale, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 887 days.

(21) Appl. No.: 11/070,907

(22) Filed: Mar. 3, 2005

(51) Int. Cl.
*G06F 21/00* (2006.01)
(52) U.S. Cl. .......................... 713/185; 726/26
(58) Field of Classification Search ............ None
See application file for complete search history.

(56) References Cited

U.S. PATENT DOCUMENTS

| | | | |
|---|---|---|---|
| 5,930,801 A * | 7/1999 | Falkenhainer et al. ... | 707/103 R |
| 5,991,878 A | 11/1999 | McDonough et al. | |
| 6,405,318 B1 | 6/2002 | Rowland | |
| 6,741,368 B1 * | 5/2004 | Hoel ........................ | 358/1.9 |
| 6,748,540 B1 | 6/2004 | Canestaro et al. | |
| 2005/0220296 A1 * | 10/2005 | Kawell et al. ............ | 380/1 |

* cited by examiner

*Primary Examiner*—Pramila Parthasarathy
(74) *Attorney, Agent, or Firm*—Robert C Kowert; Meyertons, Hood, Kivlin, Kowert & Goetzel, P.C.

(57) ABSTRACT

A system and method for restricting data access from an electronic document configured to access external data resources (e.g., websites, disk storage). To restrict unwanted data sharing, the document is prohibited from accessing external data resources unless it has a token corresponding to the resource. "Get" tokens and "send" tokens are granted, respectively, whenever the document is permitted to receive data from or send data to a data resource. Every attempt to receive data is automatically approved. An attempt to send data is approved automatically only if the document: (a) has no get tokens, (b) has only one get token and is attempting to send to the same resource, or (c) already has a send token corresponding to the resource and the set of get tokens has not changed since data was last sent to the resource. Otherwise, the attempt must be approved by an operator or data access policy.

28 Claims, 2 Drawing Sheets

SYSTEM AND METHOD FOR RESTRICTING DATA ACCESS

BACKGROUND

This invention relates to the field of computer systems. More particularly, a system and methods are provided for restricting data access from electronic documents, in order to prevent unauthorized sharing of data.

Electronic documents come in many forms, and may contain various types of content, including text, data, graphics, video, sound and so on. Electronic document contents may therefore be static or dynamic, and may include other documents or even executable code such as an application, an applet, a script, etc.

Because documents and document contents are no longer static and passive, they can be configured to access other documents or data resources. For example, a script or applet embedded in one document may, when the document is opened, automatically retrieve data from another document, a database, a web server or some other external resource, and/or send data to an external resource.

However, this ability to share or distribute data through a document gives rise to security and privacy concerns. For example, a document opened within an organization's internal network could be configured (e.g., with a script or applet) to send sensitive information to an entity (e.g., web server) outside the network. Or, the document could be configured to import a virus or other undesirable data from an external location. Typically, documents and applications that manipulate documents are not configured to monitor data accesses involving data sources or resources external to the documents.

Therefore, there is a need for a system and a method of restricting the ability of a document, or a component of a document, from accessing undesirable data or undesirable data sources or resources.

SUMMARY

In one embodiment of the invention, a system and methods are provided for restricting data access from an electronic document having one or more components or objects (e.g., JavaScripts, applets) configured to access external data resources (e.g., websites, disk storage).

To avoid unwanted data sharing, the document is prohibited from accessing such resources unless it has a token corresponding to the resource. A resource may be uniquely identified as a combination of a protocol (e.g., FTP, HTTP) and a location (e.g., www.adobe.com). "Get" tokens and "send" tokens are granted, respectively, whenever the document is permitted to receive data from or send data to a data resource.

In one embodiment of the invention, every attempt to receive data from a data resource is automatically approved. An attempt to send data is approved automatically only if the document: (a) has no get tokens, (b) has only one get token and is attempting to send to the resource associated with that get token, or (c) already has a send token corresponding to the resource and the set of get tokens has not changed since the document last sent data to the resource. Otherwise, approval must be obtained from an operator before the attempt is approved.

The operator may be a user or other human, or may comprise a policy or list of approved/disapproved resources.

DETAILED DESCRIPTION

Figure 1:
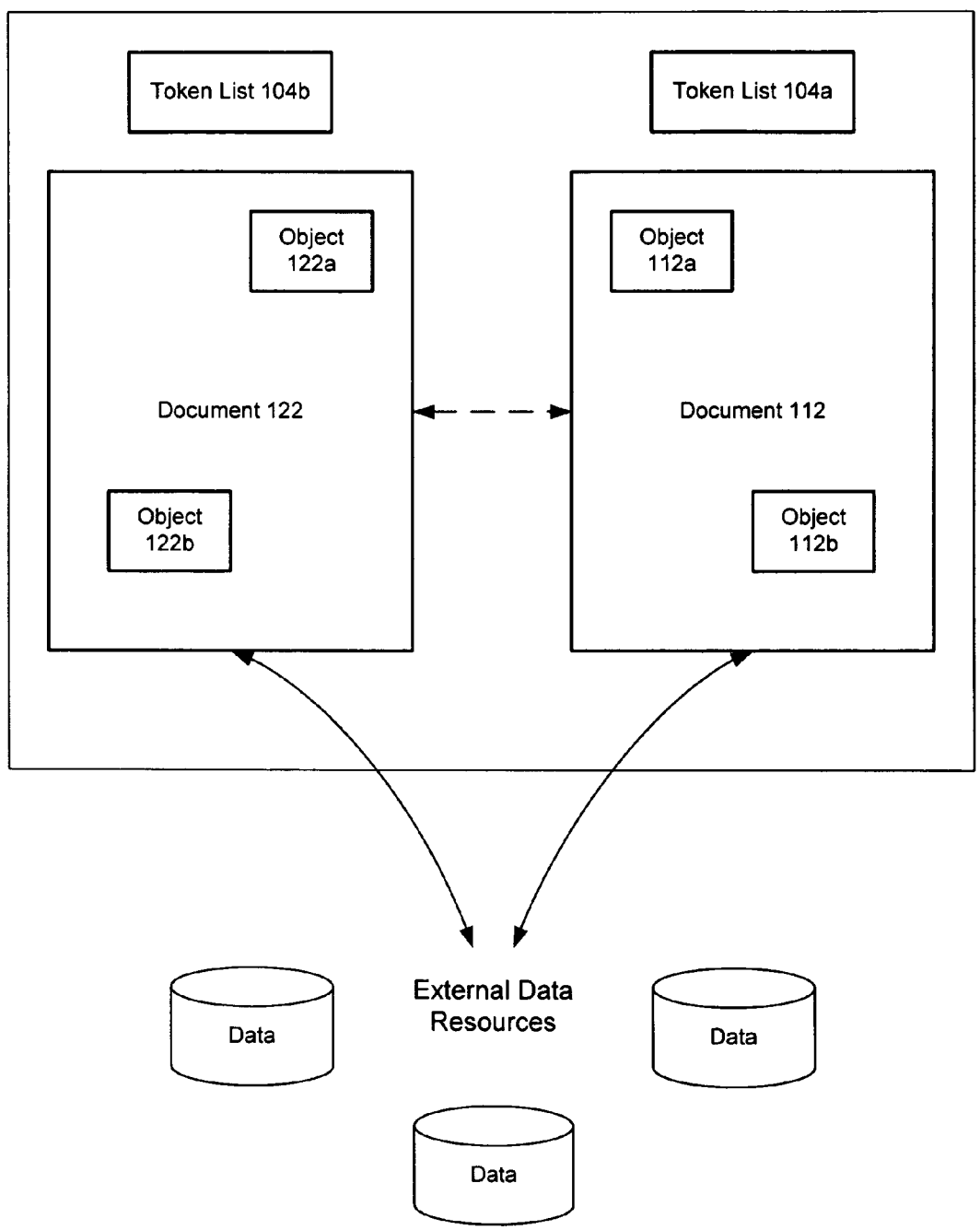
FIG. 1 is a block diagram depicting electronic documents accessing external data resources, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and methods are provided for restricting data access. This embodiment may be implemented to prevent a document or a component of a document (e.g., an embedded script or applet) from accessing a data resource external to the document. For example, this embodiment may be implemented within Acrobat, a program provided by Adobe Systems, Inc.

This embodiment of the invention may also be implemented for other types of data manipulation or management programs, such as a browser, word processing software, a web server, web page development software, a database management system, an electronic mail application or server, etc.

Within a document, various types of data access requestors may operate to send data to, and/or receive data from, resources or entities external to the document. A requestor may be an application, an applet, a servlet, a script (e.g., JavaScript), markup language (e.g., XML (eXtensible Markup Language), HTML (HyperText Markup Language)), etc. The data resource may be a website, a storage device (e.g., disk drive), a database, and so on, and may be local to the requester (or the computer system the requestor executes on) or may be accessed across a network or other communication link. The document itself may be considered a requestor if it includes one or more objects or components configured to exchange data with an external resource.

In one embodiment of the invention, tokens are granted to or associated with documents that attempt to send or receive data (or data access requesters operating within the documents), but only if the attempted access is permitted. Thus, each token corresponds to a unique data resource that the document is permitted to send data to or receive data from. An attempted data access will be denied unless the requesting document possesses a token for the corresponding data resource. In this embodiment, a data resource is defined by a scheme or protocol (e.g., FTP (File Transfer Protocol), HTTP (HyperText Transfer Protocol), SOAP (Simple Object Access Protocol)) and a host. Illustratively, the host may be expressed as a URI (e.g., www.adobe.com).

In one implementation, tokens are awarded when particular API (Application Program Interface) calls are made. For example, an application such as Adobe Acrobat may initiate various API calls (e.g., SOAP.connect, doc.submitForm, ADBC.newConnection) to send or receive data. As part of such a call, the application will determine whether the requested access is permitted, and award tokens as warranted. Rules for determining whether to permit access and grant a token are described further below.

In one implementation of this embodiment of the invention, a document has two associated sets of tokens—a set of "get" tokens and a set of "send" tokens. Each get token awarded to the document indicates that the document is permitted to receive data from the data resource associated with the token; each send token allows the document to send data to the associated data resource.

Illustratively, a separate data structure may be used to maintain each document's tokens. Alternatively, multiple documents may be associated with a single token data structure if their access to data is to be restricted in the same manner. For example, if one document shares data with another document, the sets of get and send tokens for the documents may be merged and stored in one structure referenced by both documents. Or, one document's tokens may be abandoned and they may both share the other document's token data structure.

This scheme of sharing tokens prevents cooperating requestors from accomplishing what neither could do alone. More specifically, a first requester may be permitted to retrieve data from one location (e.g., www.hr.adobe.com), but may thereafter be restricted from sending data to another location (e.g., www.hacker.com) in order to avoid undesired data sharing. By merging the first requestor's tokens with the tokens of a second requestor that the first requestor sends data to, the second requestor is also restricted from sending data to the undesired location. Thus, unwanted data sharing can be prevented even as data migrates from one data access requestor to another.

FIG. 1 depicts data access from electronic documents, according to one embodiment of the invention. In FIG. 1, application 102 is a program for creating, modifying and/or managing electronic documents such as documents 112, 122. Application 102 may comprise a document presentation program, an electronic mail program, a word processor, a database, a spreadsheet, etc.

Document 112 includes any number of objects or components, such as objects 112a, 112b, which may be JavaScript objects, applets or other compilations of processor executable instructions. Similarly, document 122 includes objects 122a, 122b. Documents 112, 122 may share data with each other and/or with data resources external to application 102, such as databases, file servers, web servers, and so on.

For each document, application 102 maintains a list, array, queue or other data structure for maintaining tokens awarded to the application. Illustratively, token list 104a stores tokens awarded to or associated with document 112, while token list 104a stores tokens corresponding to document 122.

In different embodiments of the invention, different rules or policies for adjudicating data access requestors' access requests and awarding tokens may be applied. In one embodiment, rules similar to the following may be applied:

1. All attempts to receive data are automatically approved, and the requester is granted a get token for the corresponding data resource;
2. If a requestor's set of get tokens is empty, any request to send data is automatically granted and the requestor is automatically granted a send token for the corresponding data resource;
3. If a requestor has only one get token, a request to send data to the data resource corresponding to the get token is automatically approved and a send token is granted;
4. After a requester is granted a send token for a data resource, as long as the requestor's set of get tokens has not changed since the last use of that send token, a subsequent attempt to send data to the same data resource will be automatically approved; and
5. Otherwise, if a requestor has multiple get tokens, any request to send data must be approved (e.g., by an operator, by a user).

Illustratively, these rules are applied in order until one fits the circumstances.

In this embodiment of the invention, a requestor's set of send tokens may be purged whenever a new get token is awarded to the requestor. In alternative embodiments this may not occur, or send tokens may have expiration dates or times associated with them.

In one alternative embodiment of the invention, only specified data is protected from undesired sharing. For example, the application in which this embodiment is implemented may maintain a list of data sources (e.g., by file, URL) having data that are to be protected. A requestor's ability to send data to other data resources may then only be restricted if the requestor previously received data from one of the protected sources.

Thus, rules such as those described above may be modified to allow the requestor to send data to any external resource until the requestor obtains data from a protected source. At that time, the requestor's set of send (and, possibly, get) tokens may be cleared and the rules may be applied normally.

Similarly, an external data resource may be approved for receiving any data from a requester. In this case the rules for restricting data access could be modified to allow such access by default, but to apply the rules normally for other data resources.

Figure 2:
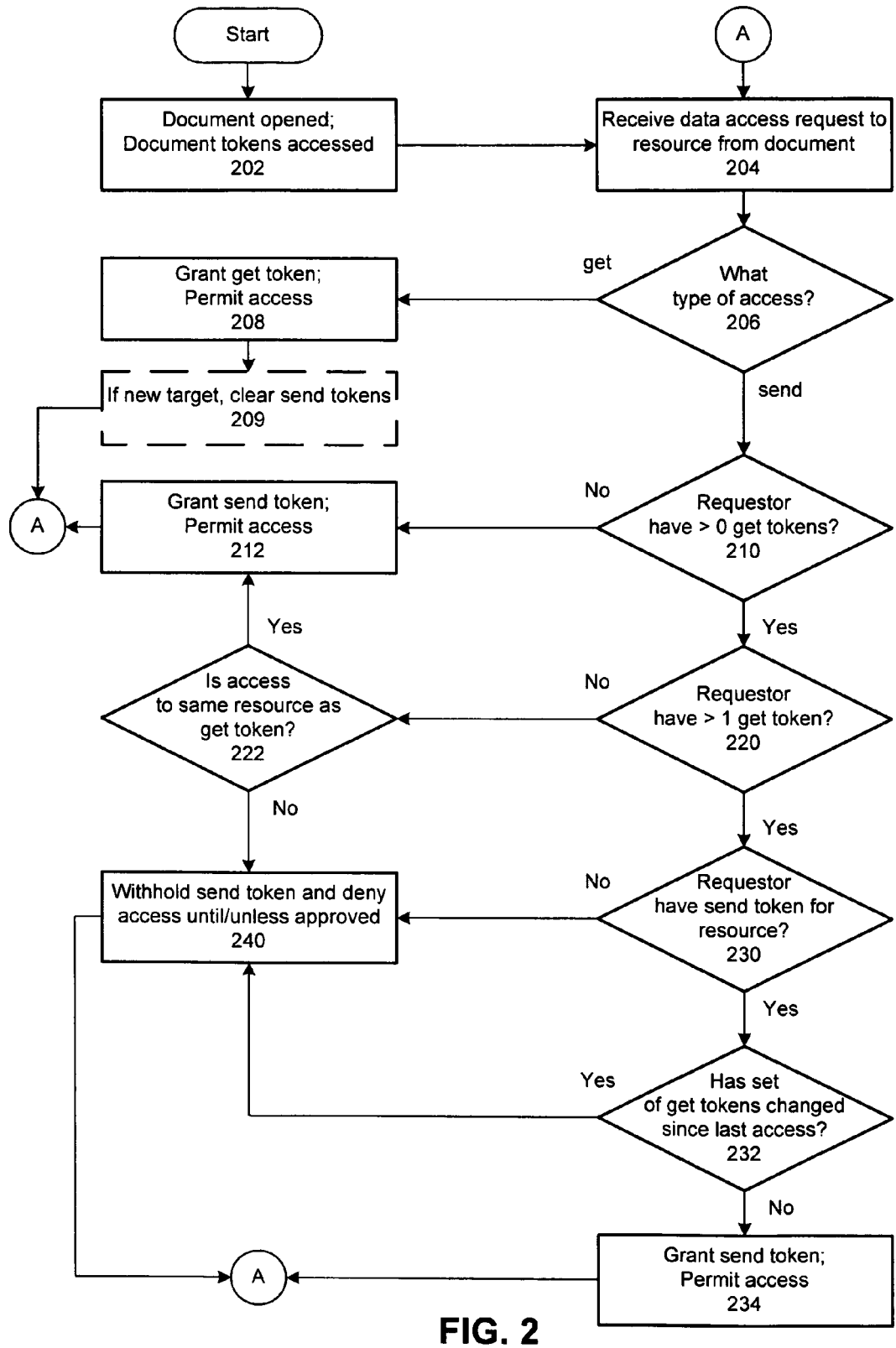
FIG. 2 is a flowchart illustrating one method of restricting a document's access to an external data resource, in accordance with an embodiment of the invention.

FIG. 2 illustrates a method of restricting data access from an electronic document, according to one embodiment of the invention. In this embodiment, documents are managed, created or otherwise manipulated by a document presentation program such as Adobe Acrobat. This embodiment may be implemented in virtually mode of operation of the application (e.g., interactive, batch, console), and may operate on client systems, servers and/or other types of computing devices.

The illustrated method may be readily modified for other types of applications, such as web servers, document editors, browsers, and so on. The method may only be applied for data accesses initiated by a document or a component or object of a document; data accesses initiated by a user or operator (e.g., Open, Save, Email, Forward) may or may not be treated according to this method.

In operation 202, a document is opened and a collection of tokens previously associated with or granted to the document is retrieved. The document is considered a data access requestor because it includes one or more components or objects (e.g., scripts, applets, methods) configured to send data to or receive data from a resource external to the document.

In operation 204, the application receives a data access request from the document (or a component or object of the document), to access an external data resource. The resource may be identified as a combination of a protocol or scheme (e.g., ftp, http, file) and a specific host (e.g., www.adobe.com).

The request may be received in the form of an API call. Thus, this embodiment of the invention may involve the modification of, or hooks into, JavaScript calls such as doc.submitForm, soap.connect, soap.request, soap.response, doc.getURL, doc.mailDoc, doc.mailForm, ADBC.newConnection, app.activeDocs, app.openDoc, doc.save, doc- .saveAs, app.launchURL, app.mailMsg, doc.importDataObject and/or others. This list is not exhaustive. Virtually any method, call, function or property that may access an external data resource may be modified or augmented to enable the restriction of data access as described herein.

In operation 206, the manner in which the data access request depends upon the type of access being requested. If the data access is intended to retrieve or get data, the method continues with operation 208. If the data access is intended to transmit or send data, the method advances to operation 210. In an embodiment of the invention, saving or writing the document, or a portion thereof, may be treated as a request to send data.

In operation 208, the application automatically approves the requested "get" access and grants the document a get token specific to the identified data resource. Illustratively, the get token is added to a list, queue, array or other data structure configured to maintain the document's get tokens.

Other than identifying the corresponding data resource, a get token may include information such as a timestamp indicating when the token was granted and/or last used to access the resource, the data that was received from the resource, etc.

In optional operation 209, if the requester has not previously retrieved data from the identified data resource (e.g., if the requester did not previously have a get token for the resource), the requestor's set of send tokens may be emptied. After operation 209, the method may end or return to operation 204.

The action to be taken for a "send" data access request depends on several factors.

In operation 210, if the document has no associated get tokens (i.e., its set of get tokens is empty), the illustrated method continues with operation 212; otherwise, the method advances to operation 220.

In operation 212, the application automatically approves the requested "send" access and grants the document a send token specific to the identified data resource. Illustratively, the send token is added to a list, queue, array or other data structure configured to maintain the document's send tokens.

Other than identifying the corresponding data resource, a send token may include information such as a timestamp indicating when the token was granted and/or last used to access the resource, the data that was sent to the resource, etc. After operation 212, the method may end or return to operation 204.

In operation 220, if the requestor has more than one get token, the illustrated method advances to operation 230; otherwise (i.e., the document has exactly one get token), the method continues with operation 222.

In operation 222, it is determined whether the requested send access is to the resource associated with the document's sole get token. If so, the method continues with operation 212. If the requested send access is not to the same resource, the method advances to operation 240.

In operation 230, it is determined whether the document already has a send token for the specified data resource. If so, the illustrated method continues with operation 232; otherwise, the method advances to operation 240.

In operation 232, it is determined whether the document's set of get tokens has changed (e.g., whether one or more get tokens have been added) since the document last accessed the data resource. If the document's get tokens have changed, the method advances to operation 240; otherwise the method continues with operation 234.

In operation 234, the application automatically approves the requested "send" access and grants the document a send token specific to the identified data resource. After operation 234, the method may end or return to operation 204.

In operation 240, the application does not automatically approve the requested send access, because an improper or undesired sharing of data may result. For example, the document may be trying to send sensitive data to an undesirable location. Therefore, the application may alert a user or an operator and await a determination as to whether the requested access should be approved.

With the alert, the application may identify the source and/or destination of the data, the type of access being requested, the data involved, etc. If the access is approved, the application may then allow the data access and grant the document a corresponding send token. Access may be automatically approved or denied if the user/operator does not respond within some period of time. After operation 240, the illustrated method may end or return to operation 204.

In the embodiment of the invention depicted in FIG. 2, if send tokens are cleared when a new get token is awarded (i.e., in operation 209), user/operator approval of a data access request to a resource may only be required when the requestor does not already have a send token for the resource, but possesses one or more get tokens for other resources.

In one alternative embodiment of the invention, instead of requiring user/operator approval of a possible unwanted data access, the access may be automatically denied. Yet further, a list of approved or disapproved data resources may be maintained, and the list may be searched for the data resource that the document is attempting to access. Thus, for purposes of an embodiment of the invention described herein, a policy for determining whether to automatically approve or disapprove a possibly undesirable data access attempt may be considered to be an "operator" (e.g., in operation 240 of FIG. 2).

The form in which an alert or notification may be performed may differ in different embodiments of the invention. In one embodiment, a traditional dialog box may be displayed, providing the user or operator with options such as "Allow access" and "Deny access."

In an embodiment of the invention, a document's tokens are automatically saved when the document is closed, and deleted if/when the document is deleted. Alternatively, other action may be taken. For example, when a document is closed, its associated send tokens may be cleared but its get tokens may be retained. A document's tokens may be stored locally (e.g., on the computer system on which the document was opened) and/or globally or centrally (e.g., so the tokens may be used when the document is opened on a different computer system or in a different application). In particular, tokens may be stored as global objects, so that they may be accessed across application sessions and/or documents.

When one document or requestor exchanges data with another, any or all of their tokens may be merged to prevent one of them from sending data to a location or via a protocol that the other could not. Illustratively, both documents' metadata may be modified to reference or identify a single merged token storage structure. This sharing of a single token storage structure may be maintained until one of them is deleted, or for some distinct period of time.

For example, when one of the documents is closed, a new token storage structure may be created for that document (copied from the merged structure, and each document would then return to having its own token storage structure. Alternatively, if the documents continue to share one structure, whenever one of them is granted a token, it will be added to the structure.

Any number of documents may share one token structure. Thus, if data is passed among a series of documents, they may end up all sharing a single structure.

In one embodiment of the invention, a token (e.g., a send token) may expire after some period of time (e.g., one day, thirty days), after which it is automatically deleted. In another embodiment, a document's entire set of get or send tokens may be cleared at some interval (e.g., ten days after the document is last closed), or tokens may be retained only for some number of documents most recently used. Default sets of get and/or set tokens may be automatically associated with a newly created document or a new requestor that is added to a document.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of restricting data access, comprising:
    performing the following on a computer:
    detecting an attempt by a first requester to access a first data resource, said first requester comprising computer executable instructions for accessing data;
    if the attempted access is to retrieve data:
        allowing the attempted access; and
        adding a get token corresponding to the first data resource to a first set of get tokens maintained for the first requester; and
    if the attempted access is to send data:
        if said first set of get tokens is empty, allowing the attempted access;
        if said first set of get tokens includes only a single get token, allowing the attempted access if the first data resource is the same data resource corresponding to said single get token; and
        if said first set of get tokens includes multiple get tokens, restricting the attempted access if the first requestor previously sent data to the first data resource and said first set of get tokens has changed since the first requester last sent data to the first data resource.

2. The method of claim 1, further comprising, if the attempted access is to get data:
    if said first set of get tokens did not include said get token prior to said adding, purging a first set of send tokens maintained for the first requester.

3. The method of claim 1, further comprising,
    if the attempted access is to send data:
        if the first requestor previously sent data to the first data resource:
            allowing the attempted access if said first set of get tokens has not changed since the first requester last sent data to the first data resource.

4. The method of claim 1, wherein said restricting comprises:
    allowing the attempted access only if the attempted access is approved by an operator.

5. The method of claim 1, wherein said restricting comprises:
    allowing the attempted access if the attempted access is approved by a pre-configured data access policy.

6. The method of claim 1, wherein said restricting comprises:
    allowing the attempted access if the first data resource is included in a list of approved of data resources.

7. The method of claim 1, wherein said restricting comprises:
    issuing an alert regarding the attempted access.

8. The method of claim 1, further comprising, if the attempted access is to send data:
    if the attempted access is allowed, adding a send token corresponding to the first data resource to a first set of send tokens maintained for the first requestor.

9. The method of claim 1, wherein the first data resource comprises a second requester for which a second set of get tokens is maintained, the method further comprising:
    examining said second set of get tokens; and
    if one or more get tokens in said second set of get tokens are not included in said first set of get tokens:
        merging said first set of get tokens and said second set of get tokens.

10. The method of claim 9, further comprising:
    replacing said first set of get tokens and said second set of get tokens with said merged set of get tokens.

11. The method of claim 10, further comprising:
    merging a first set of send tokens maintained for the first requester and a second set of send tokens maintained for the second requestor.

12. The method of claim 10, further comprising:
    replacing a second set of send tokens maintained for the second requester with a first set of send tokens maintained for the first requestor.

13. The method of claim 1, further comprising:
    saving said first set of get tokens when the first requester is terminated.

14. The method of claim 13, further comprising:
    saving a first set of send tokens maintained for the first requestor when the first requestor is terminated.

15. The method of claim 1, wherein the first requestor comprises an electronic document.

16. The method of claim 1, wherein the first requestor comprises a script.

17. A computer readable memory storing instructions that, when executed by a computer, cause the computer to perform a computer-implemented method of restricting data access, comprising:

detecting an attempt by a first requester to access a first data resource, said first requester comprising computer executable instructions for accessing data;

if the attempted access is to retrieve data:

allowing the attempted access; and adding a get token corresponding to the first data resource to a first set of get tokens maintained for the first requestor; and if the attempted access is to send data:

if said first set of get tokens is empty, allowing the attempted access;

if said first set of get tokens includes only a single get token, allowing the attempted access if the first data resource is the same data resource corresponding to said single get token; and if said first set of get tokens includes multiple get tokens, restricting the attempted access if the first requester previously sent data to the first data resource and said first set of get tokens has changed since the first requester last sent data to the first data resource.

18. An apparatus for restricting data access from an electronic data access requestor, the apparatus comprising:

a processor; and memory storing:

a first data access requester comprising computer instructions executable by the processor to access data resources external to the apparatus;

a first set of get tokens associated with the first data access requestor, wherein each said get token in said first set of get tokens corresponds to a data resource from which the first data access requestor has received data;

a first set of send tokens associated with the first data access requester, wherein each said send token in said first set of send tokens corresponds to a data resource to which the first data access requester has sent data; and computer instructions executable by the processor for determining whether to associate a new get token or a send token with the first data access requester, wherein said determining whether to associate a new send token with the first data access requester is dependent on the current first set of get tokens associated with the first data access requester, wherein access to the corresponding data resource is permitted if said determining results in the new send token being associated with the first data access requester, and access to the corresponding data resource is restricted if said determining does not result in the new send token being associated with the first data access requester.

19. The apparatus of claim 18, wherein the apparatus is configured to:

intercept a data access attempt from the first data access requester to a first data resource; and if the data access attempt is an attempt to retrieve data from the first data resource:

allow the data access; and add to said first set of get tokens a get token corresponding to the first data resource.

20. The apparatus of claim 19, wherein the apparatus is configured to:

if the first set of get tokens did not include said get token prior to the data access attempt, delete all send tokens in said first set of send tokens.

21. The apparatus of claim 18, wherein the apparatus is configured to:

intercept a data access attempt from the first data access requester to a first data resource; and if the data access attempt is an attempt to send data to the first data resource, allow the data access if said first set of get tokens is empty.

22. The apparatus of claim 18, wherein the apparatus is configured to:

intercept a data access attempt from the first data access requester to a first data resource; and if the data access attempt is an attempt to send data to the first data resource, allow the data access if:

said first set of get tokens includes only a single get token; and said single get token corresponds to the first data resource.

23. The apparatus of claim 18, wherein the apparatus is configured to:

intercept a data access attempt from the first data access requester to a first data resource; and if the data access attempt is an attempt to send data to the first data resource, allow the data access if:

said first set of send tokens includes a first send token corresponding to the first data resource; and said first set of get tokens has not changed since the first data access requester last sent data to the first data resource.

24. The apparatus of claim 18, wherein the apparatus is configured to:

intercept a data access attempt from the first data access requester to a first data resource; and if the data access attempt is an attempt to send data to the first data resource and said first set of get tokens comprises multiple get tokens:

allow the data access attempt only if the data access attempt is approved by an operator.

25. The apparatus of claim 18, wherein the apparatus is configured to:

merge said first set of get tokens with a second set of get tokens associated with a second data access requestor.

26. The apparatus of claim 25, wherein the apparatus is further configured to:

merge said first set of send tokens with a second set of send tokens associated with a second data access requester.

27. The apparatus of claim 18, wherein the first data access requester comprises a script.

28. The apparatus of claim 18, wherein the first data access requester comprises an electronic document.

\* \* \* \* \*

UNITED STATES PATENT AND TRADEMARK OFFICE
CERTIFICATE OF CORRECTION

PATENT NO. : 7,644,286 B1
APPLICATION NO. : 11/070907
DATED : January 5, 2010
INVENTOR(S) : Mohr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1343 days.

Signed and Sealed this

Sixteenth Day of November, 2010

David J. Kappos
*Director of the United States Patent and Trademark Office*